W. C. LONGENECKER.
COTTON CHOPPER.
APPLICATION FILED FEB. 1, 1912.
1,054,299.
Patented Feb. 25, 1913.
3 SHEETS—SHEET 3.
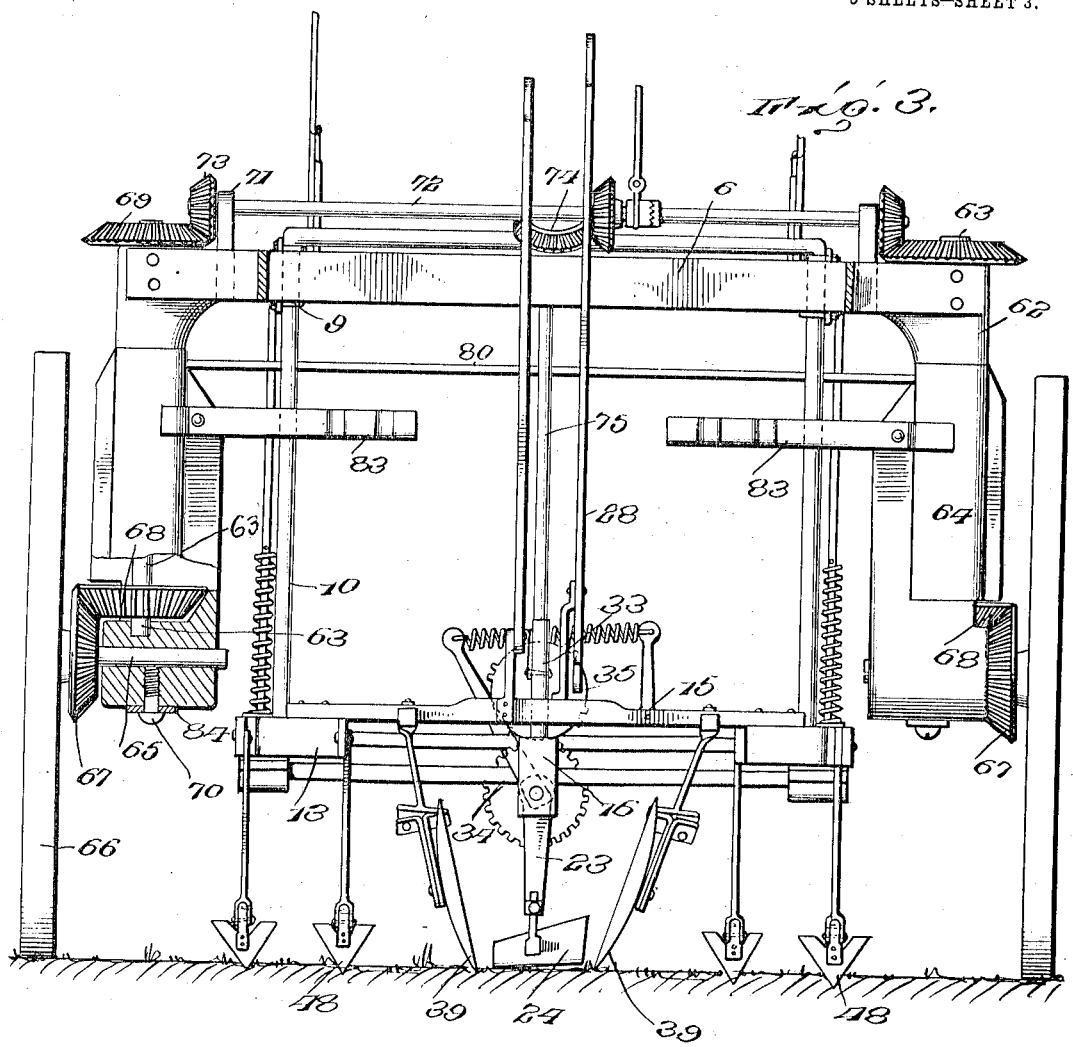
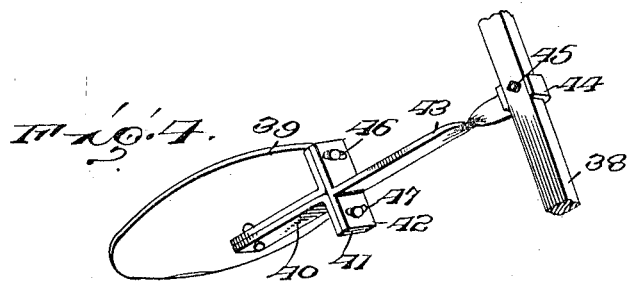
Witnesses
Inventor
W. C. Longenecker
By
Attorneys

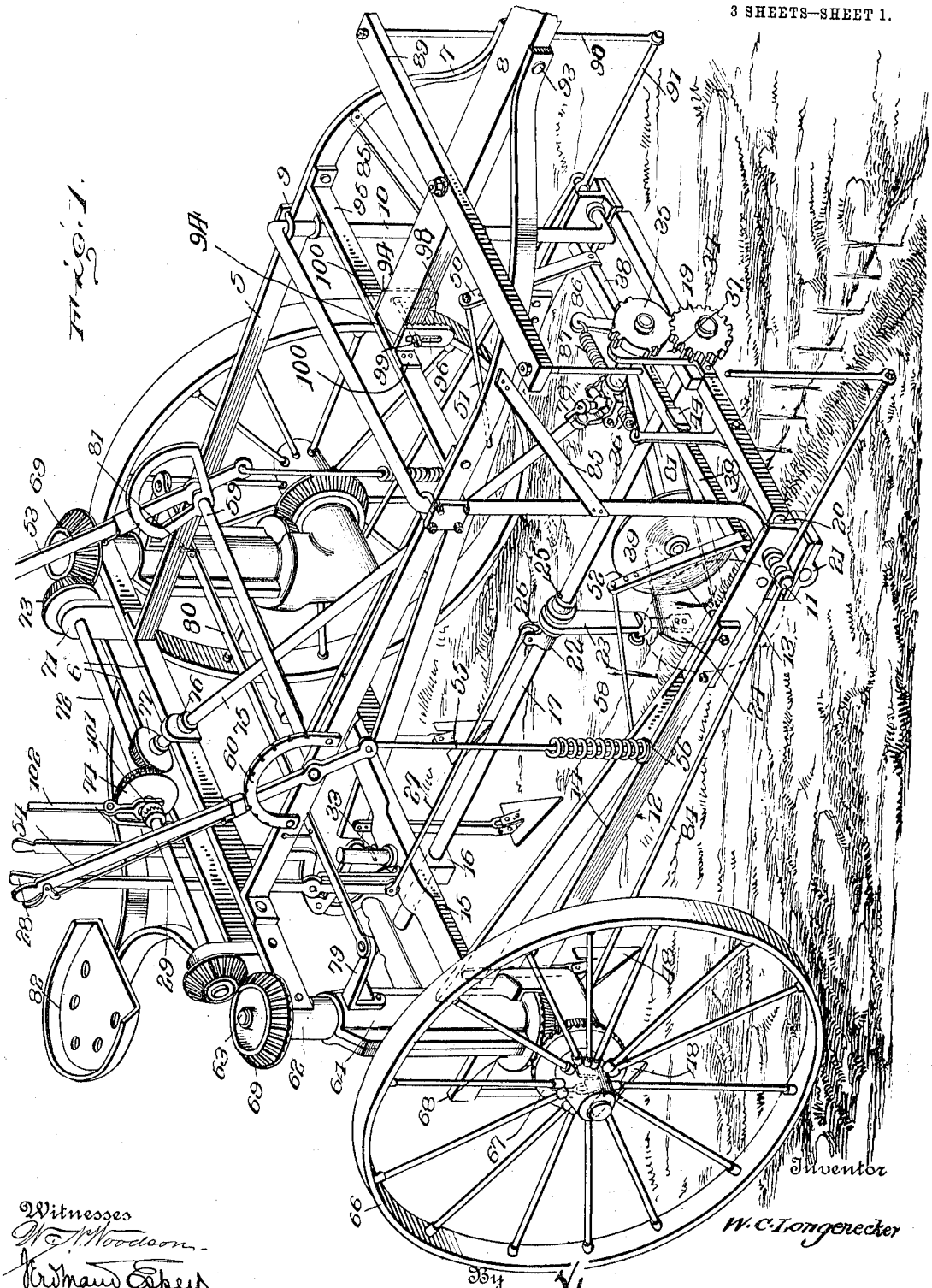

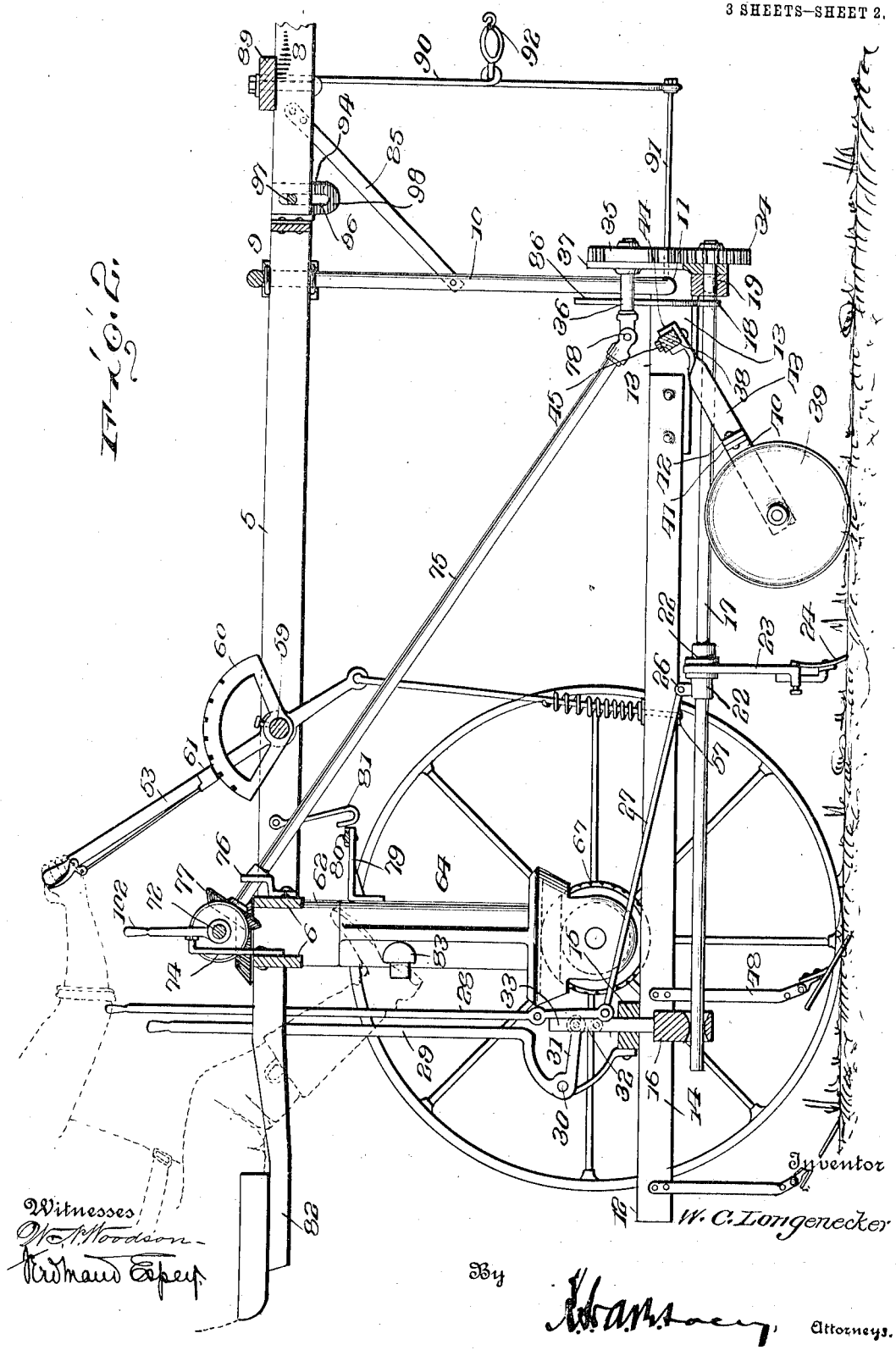

UNITED STATES PATENT OFFICE.

WILLIAM C. LONGENECKER, OF VERDEN, OKLAHOMA.

COTTON-CHOPPER.

1,054,299.   Specification of Letters Patent.   Patented Feb. 25, 1913.

Application filed February 1, 1912. Serial No. 674,763.

*To all whom it may concern:*

Be it known that I, WILLIAM C. LONGENECKER, citizen of the United States, residing at Verden, in the county of Grady and State of Oklahoma, have invented certain new and useful Improvements in Cotton-Choppers, of which the following is a specification.

This invention relates to cotton choppers and has for its object the provision of a strong, durable and thoroughly efficient machine of this character for thinning or cutting out the surplus plants in rows of young cotton so that the remaining plants in the rows may fully mature.

A further object of the invention is to provide a cotton chopper including a wheeled truck having a frame pivotally mounted thereon and provided with a reciprocating cutting blade, there being co-acting ridge forming disks disposed in advance of the cutter, and a plurality of sweeps arranged at the rear of said cutter for cleaning the furrows and throwing the earth around the standing plants.

A further object is to provide means for adjusting the pivoted frame in a vertical plane, and means independent of the frame adjusting means for raising and lowering the cutter carrying shaft.

A further object is to provide means for adjusting the angle or inclination of the ridge forming disks with respect to each other, and means for adjusting said disks transversely of the truck.

A further object is to provide a cotton chopper, the wheel supporting brackets of which are mounted to turn in unison, the construction of the machine being such that it may be used either as a cotton chopper, plow or cultivator.

A still further object of the invention is generally to improve this class of machines so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a cotton chopper constructed in accordance with my invention; Fig. 2 is a longitudinal sectional view of the same; Fig. 3 is a rear elevation, a portion of one of the wheel supporting brackets being broken away to show the construction of the adjacent spindle; Fig. 4 is a perspective view of one of the ridge forming disks detached.

Corresponding and like parts are referred to in the following description and indicated in all the views of the drawings by the same reference characters.

The improved cotton chopper forming the subject matter of the present invention comprises a supporting frame including spaced longitudinal bars 5 having their rear ends connected by transverse bars 6 and their forward ends bent inwardly at 7 to form a support for a draft tongue, indicated at 8. Depending from the longitudinal bars 5 of the supporting frame and rigidly secured thereto in any suitable manner as by clips 9, is an inverted U-shaped yoke or frame 10, the side bars of which are bent laterally to form oppositely disposed trunnions 11 on which is pivotally mounted for tilting movement a vertically adjustable frame 12 carrying the chopping mechanism. The frame 12 comprises spaced castings 13 to which are bolted or otherwise rigidly secured diverging longitudinally disposed bars 14. The rear ends of the inner bars 14 are connected by a transverse bar 15 having a depending bearing 16, in which is journaled one end of an oscillating shaft 17, the other end of which is journaled in a similar bearing 18 formed in a transverse bar 19 arranged at the pivoted end of the frame 12, as shown. The opposite ends of the transverse bar 19 are provided with trunnions 20 which fit within bearings 21 secured to the lower faces of the castings 13.

Mounted on the rod or shaft 17, is a sleeve 22 having a depending shank 23 to which is secured a cutting blade 24, the latter being adapted to cut or chop the surplus plants in a row and thus thin out said cotton plants as the machine is drawn over a field or other inclosure. The sleeve carrying the cutting blade is free to move longitudinally on the shaft 17, but is held against independent rotation by means of a key or spline 25. Extending upwardly from the sleeve 22, is an ear 26 to which is connected one end of a rod 27, the other end of said rod being pivotally mounted on the adjacent end of an operating lever 28, so that by moving the handle of the lever 28 backward and forward, the cutter 24 may be moved to different positions of adjustment on the shaft 17, thus to allow said cutter to skip or omit certain of the young cotton plants, when desired.

As a means for raising and lowering the shaft carrying the cutting blade 24, there is provided a lever 29, the lower end of which is pivotally mounted at 30 on a suitable bracket or support, and is formed with an angular arm 31 which arm is connected through the medium of a link 32 with an extension 33 formed on the bearing 16 and slidably mounted on the bar 15.

The forward end of the shaft 17 is provided with a gear wheel 34, which meshes with a mutilated gear 35 secured to a stub shaft 36 journaled in a bracket 37 secured to and projecting vertically from the front bar 19.

Journaled in the castings 13 of the tilting frame, is a transverse bar 38 on which are mounted co-acting disks 39, the latter being disposed in advance of the cutter 24 and adapted to form a ridge or hill around the growing plants as the machine moves in a forward direction. Each ridge forming disk 39 is journaled on a bracket 40 having laterally extending ears 41 which co-act with similar ears 42 formed on a supporting bar 43, the latter being provided with a terminal socket 44 which embraces the bar 38, so that by loosening the bolt 45, the disks 39, together with the bars or supports 43 may be adjusted transversely of the machine. The ears 42 are provided with segmental slots 46 through which extend clamping screws 47 for engagement with the lower ears 41. Thus it will be seen that by loosening the clamping screws 47, the ridge forming disks 49 may be adjusted at any angle or inclination with respect to each other and in which position they may be securely clamped by tightening the clamping screws 47.

Arranged at the rear of the cutting blade 24 and depending from the inner and outer bars 14 of the pivoted frame 12, are sweeps 48, the function of which is to clear the furrow and throw the dirt around the young cotton plants left standing after the passage of said cutting blade.

The bar 38 is journaled in the castings 13 and is provided with oppositely disposed upstanding arms 50 to which are secured links or rods 51, which links are in turn secured to the inner bars 14 of the tilting frame. The arms 50 are provided with a series of openings 52, so that by inserting the adjacent ends of the rods 51 in the different openings 52 of the arms 50, the ridge forming disks may be raised or lowered at will.

Pivotally mounted on the longitudinal bars of the truck frame, are levers 53 and 54 to which are pivotally connected depending rods 55, the lower ends of which extend through suitable plates or washers 56 mounted on the side bars of the frame 12 and are provided with terminal keys or pins 57. Encircling the rods 55 are coiled springs 58, one end of each of which is secured to the adjacent rod 55, while the other end thereof bears against the washer 56, said springs serving to permit a slight upward movement of the frame 12 and also serving to prevent injury to the frame should the machine strike a stone or other obstruction in its passage over a field. The levers 53 and 54 are connected by a rod 59 so that by operating the lever 54, an upward pull will be exerted on both rods 55 to effect the raising or lowering of the frame 12. Each lever is provided with a rack 60 adapted to receive a locking pawl or catch 61, one of the racks 60 being rigidly secured to the adjacent longitudinal bar 5 of the truck frame, while the other rack bar is secured to and movable with the connecting bar 59. The lever 53 is loosely mounted on the rod 59 and is caused to turn with said rod by means of the pawl on the lever 53 engaging the adjacent rack. The lever 53 may be operated independently of the lever 54 by disengaging the pawl on the lever 53 from the adjacent rack. Thus it will be seen that by operating the lever 54, the tilting frame 12 carrying the operating mechanism of the machine may be elevated so as to prevent the cutter and its associated parts from coming in contact with the ground, when the machine is not in use and it is desired to transport said machine from one place to another. It will also be seen that the mechanism for raising and lowering the cutting blade and the mechanism for effecting the vertical adjustment of the ridge forming disks are independent of the mechanism for raising and lowering the frame 12.

Depending from the transverse bars 6 of the frame, are castings 62 in which are journaled upright shafts 63. Loosely mounted for turning movement on the shafts 63, are brackets 64 in the lower ends, of which are journaled spindles 65 carrying ground wheels 66. Secured to the ground wheels 66, are bevel gears 67 which mesh with corresponding bevel gears 68 secured to the lower ends of the adjacent vertical shafts 63, there being similar bevel gears 69 secured to the upper ends of the shafts 63, as best shown in Fig. 3 of the drawings. The spindles 65 are adjustable longitudinally within the brackets 64 so as to cause the teeth on the bevel gears 67 and 68 to intermesh should the latter become mutilated or otherwise worn from constant use, said spindles being retained in adjusted position by means of a set screw or similar fastening device 70.

Journaled in suitable brackets 71, secured to the bars 6, is a transverse shaft 72, to the opposite ends of which are keyed or otherwise rigidly secured bevel pinions 73, which pinions mesh with the adjacent bevel gears 69 and transmit motion to a bevel pinion 74 secured to the center of the transverse shaft 72.

Extending diagonally of the machine, is a shaft 75, one end of which extends through a bearing 76 and is provided with a bevel gear 77 which meshes with the bevel gear 74, while the other end thereof is connected through the medium of a universal joint 78 with the stub shaft 36 so that as the machine travels along the rows of cotton, motion will be transmitted from the ground wheels 66 through the medium of the gearing to the stub shaft 36 and thence through the gears 35 and 34 to the shaft 17, thus to intermittently reciprocate the cutting blade or chopper 24 and thin out the cotton plants at predetermined intervals.

Extending laterally from the brackets 64, are arms 79, the free ends of which are connected by a rod 80 so as to cause the brackets 64 to turn in unison. As a means for holding the wheels against tilting or pivotal movement when the machine is not in use, there are provided suitable hooks 81 having their upper ends suspended from the bars 5 and their lower ends adapted to enter openings in the connecting bar or rod 80. Extending inwardly from the brackets 64 at a point near the driver's seat 82, are foot levers 83, by pressing which the driver or operator of the machine may guide the latter at will.

In order to reinforce and strengthen the supporting frame, there are provided suitable braces 84, one end of each of which is pivotally connected with the base of the adjacent bracket 64 by the clamping screw 70, while the other end of each bracket is attached to the adjacent trunnion 11 of the yoke 10. Auxiliary braces 85 also form a connection between the side bars of the yoke 10 and the converging ends 7 of the supporting frame in order to assist in holding the yoke 10 against accidental displacement.

Secured to the forward end of the shaft 17, is an arm 86, to which is connected one end of a coiled spring 87, the other end of which is connected to a similar arm 88 carried by the bar 19. The function of the spring 87 is to return the cutting blade 24 to lowered position, after said cutting blade has been partially rotated by the gears 34 and 35.

Secured to the tongue 8, is an equalizing bar 89, to which are connected depending rods 90, the lower ends of which are connected through the medium of horizontal rods 91 with the trunnions 11. Each rod 90 is provided with an eye to which is connected a swingletree 92 for attachment to a draft animal. The intermediate portion of the tongue 8 is pivotally mounted at 93 between the side bars 7 of the frame, while the rear end thereof extends between suitable angle bars or plates 94 fastened to a transverse brace 95. The plates 94 are provided with vertical slots 96 to permit the passage of a bolt or similar fastening device 97, the inner faces of the plates 94 being serrated at 98 so that by tightening the nut 99 on the bolt 97, the tongue may be locked in different positions of adjustment. The plates 94 are preferably provided with flanges 100 to facilitate attaching said plates to the brace 95, but if desired, these flanges may be dispensed with.

In operation, as the machine is drawn over a cotton field, motion will be transmitted from the ground wheels through the medium of the aforesaid gearing to the shaft 17 to reciprocate the cutting blade, which cutting blade passes through the ridge formed by the co-acting disks 39 and cuts away or weeds out the surplus cotton plants in a row, the rear sweeps 48 serving to clear the furrow and at the same time throw or bank the earth around the remaining cotton plants in the row, in the manner before stated.

A clutch 101 is preferably mounted on the shaft 72 and provided with a lever 102 so that by operating the lever, the bevel gear 74 may be actuated to drive the cotton chopping mechanism or said shaft allowed to revolve without imparting motion to the chopping mechanism, as for instance, when transporting the mechanism from one place to another. The hubs of the ground wheel 66 are also preferably provided with the usual pawl and ratchet mechanism (not shown).

It will of course be understood that the machines may be made in different sizes and shapes, and the operating mechanism varied without departing from the spirit of the invention.

Having thus described the invention, what is claimed as new is:

1. A cotton chopper including a wheeled truck, a frame pivotally mounted on the truck, a shaft journaled on the frame, a cutting blade mounted to move with the shaft, means for transmitting motion to the said shaft, means operatively connected with the pivoted frame for raising and lowering the latter, means for adjusting the cutting blade longitudinally of the shaft, and means independent of the frame adjusting means for raising and lowering said shaft.

2. A cotton chopper including a wheeled truck, a frame pivotally mounted on the truck, a shaft journaled in the frame, a cutting blade adjustable longitudinally of the shaft and arranged to rotate therewith, means for adjusting the cutting blade longitudinally of the shaft, means operatively connected with one end of the shaft for raising and lowering the shaft, means for raising and lowering the frame, and means for transmitting motion from the wheels of the truck to said shaft.

3. A cotton chopper including a wheeled truck, a frame pivotally mounted for tilting movement on the truck, a bar journaled on the frame, a shaft carried by the bar, a cutting blade depending from the shaft, means operatively connected with the rear end of the shaft for raising and lowering said shaft, means connected with the frame for simultaneously raising and lowering the frame and cutting blade, and means for transmitting motion to said shaft.

4. A cotton chopper including a wheeled truck, a frame pivotally mounted for tilting movement on the truck, a transverse bar journaled on the frame, a shaft journaled in said transverse bar, a cutting device carried by the shaft, means connected with the rear end of the shaft for raising and lowering said shaft, means independent of the shaft for raising and lowering the frame, co-acting ridge forming devices carried by the frame and arranged in advance of the cutting blade, and means for transmitting motion from the wheels of the truck to said shaft.

5. A cotton chopper including a wheeled truck, a frame pivotally mounted for tilting movement on the truck, a shaft journaled on the frame and provided with a gear wheel, a stub shaft, a mutilated gear carried by the stub shaft and meshing with the gear on the main shaft, a cutting blade carried by the main shaft, means operatively connected with the frame for raising and lowering the latter, means for raising and lowering the main shaft independently of the frame, and means for transmitting motion from the wheels of the truck to said main shaft.

6. A cotton chopper including a wheeled truck, a frame pivotally mounted for tilting movement on the truck, a shaft journaled in the frame and provided with an arm, a second arm extending upwardly from the frame, a spring forming a connection between said arms, a cutting device carried by and adjustable longitudinally of the shaft, and means for transmitting motion from the wheels of the truck to the shaft to oscillate the cutting blade.

7. A cotton chopper including a wheeled truck, a frame pivotally mounted on the truck, and including a cross bar, a shaft journaled on the frame, a bearing for the rear end of the shaft and provided with an extension extending through the cross bar, a cutting device carried by the shaft, means operatively connected with the extension for raising and lowering the shaft, means for raising and lowering the frame, co-acting ridge forming devices carried by the frame and arranged in advance of the cutting device, a plurality of sweeps depending from the frame at the rear of the cutting device, and means for transmitting motion from the wheels of the truck to said shaft.

8. A cotton chopper including a wheeled truck, a yoke mounted on the truck and provided with trunnions, a frame pivotally mounted on the trunnions, a shaft journaled in the frame, a cutting device mounted to move with the shaft and adjustable longitudinally thereof, a lever operatively connected with the cutting device for adjusting said cutting device longitudinally of the shaft, a second lever operatively connected with the shaft for raising and lowering the latter, and means connected with the frame for raising and lowering said frame.

9. A cotton chopper including a wheeled truck, a yoke carried by the truck and provided with trunnions, a frame pivotally mounted on the trunnions and including spaced diverging bars, sweeps depending from said bars, a transverse bar connecting the diverging bars and provided with an opening, a bearing arranged beneath the bar and provided with an extension projecting through said opening, a shaft journaled in said bearing, a cutting device carried by the shaft, means connected with the extension of the bearing for raising and lowering the shaft, means for adjusting the cutting device longitudinally of the shaft, and means for intermittently actuating the cutting device.

10. A cotton chopper including a frame, bearings depending from the frame, vertical shafts journaled in the bearings, brackets journaled on the shafts, spindles carried by the brackets, ground wheels journaled on the spindles, a connection between said brackets, intermeshing gears carried by the vertical shafts and ground wheels, a cutter carrying shaft mounted for oscillation on the frame, and means for transmitting motion from the vertical shafts to the oscillating cutter carrying shaft.

11. A cotton chopper including a frame, castings depending from the frame, vertical shafts journaled in the castings and having their upper and lower ends provided with gear wheels, brackets journaled on the vertical shafts, ground wheels carried by the brackets and provided with gear wheels meshing with the lower gear wheels on the vertical shafts, a connection between said brackets, a horizontal shaft having gear wheels meshing with the upper gear wheels on the vertical shafts, a cutter carrying shaft, and means for transmitting motion from the horizontal shaft to the cutter carrying shaft.

12. A cotton chopper including a frame, castings depending from the frame, vertical shafts journaled in the castings and having their upper and lower ends provided with bevel gears, brackets journaled on the vertical shafts, ground wheels carried by the brackets and provided with bevel gears meshing with the lower bevel gears on said shafts, a rod connecting the brackets for causing the ground wheels to move in unison, a horizontal shaft having bevel gears meshing with the upper bevel gears on the vertical shafts, a cutter carrying shaft, means for transmitting motion from the horizontal shaft to the cutter carrying shaft, and means carried by the frame and engaging the connecting rod for preventing turning movement of the brackets.

13. A cotton chopper including a frame, castings depending from the frame, vertical shafts journaled in the castings and having their upper and lower ends provided with bevel gears, brackets journaled on the vertical shafts, ground wheels carried by the brackets and provided with bevel gears meshing with the lower bevel gears on the shafts, a horizontal shaft having oppositely disposed bevel gears meshing with the upper bevel gears on the vertical shafts, a cutter carrying shaft, a gear wheel secured to the cutter carrying shaft, a stub shaft, a mutilated gear carried by the stub shaft and meshing with the gear on the cutter carrying shaft, a diagonally disposed shaft having a universal connection with the stub shaft, and intermeshing gears carried by the horizontal shaft and diagonal shaft for transmitting motion from one to the other.

14. A cotton chopper including a frame, castings depending from the frame, vertical shafts journaled in the castings and provided with upper and lower bevel gears, brackets journaled on the vertical shafts, ground wheels carried by the brackets and provided with bevel gears meshing with the adjacent bevel gears on the vertical shafts, a rod forming a connection between said brackets, foot levers extending laterally from the brackets for turning the latter, means for locking the connecting rod against movement, a horizontal shaft having terminal gears meshing with the upper gears on the vertical shafts, a yoke depending from the frame, an auxiliary frame pivotally mounted on the yoke, a cutter carrying shaft mounted in said frame, a gear wheel secured to the cutter carrying shaft, a stub shaft arranged above the cutter carrying shaft, a mutilated gear carried by the stub shaft and meshing with the gear wheel on the cutter carrying shaft, and means for transmitting motion from the horizontal shaft to the stub shaft.

15. A cotton chopper including a wheeled truck, a yoke depending from the truck and provided with trunnions, a frame pivotally mounted on the trunnions, a shaft journaled in the frame, a cutting device carried by the shaft, levers pivotally mounted on the truck, rods forming a connection between the levers and pivoted frame, coiled springs surrounding the rods, a bar connecting said levers, a rack carried by the connecting bar and co-acting with the adjacent lever, a similar rack rigidly secured to the frame of the truck and co-acting with the other lever, and means for oscillating the cutter carrying shaft.

In testimony whereof I affix my signature in presence of two witnesses.

WILLIAM C. LONGENECKER. [L. S.]

Witnesses:
J. D. YOAKLEY,
W. N. WOODSON.